Figure 1:
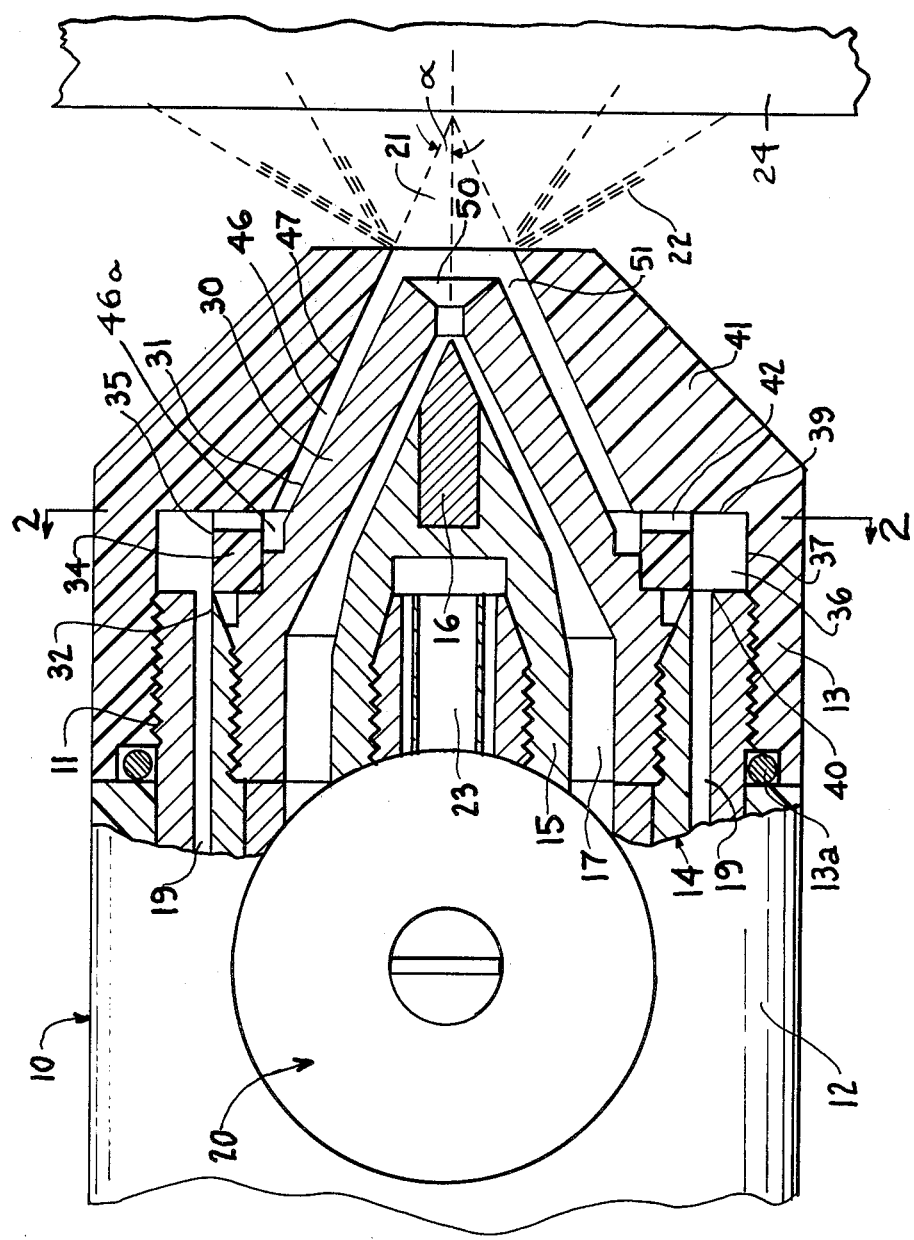

United States Patent [19]

Beloev et al.

[11] 4,369,919
[45] Jan. 25, 1983

[54] PLASMA TORCH FOR PROCESSING METALS IN THE AIR AND UNDER WATER

[75] Inventors: Marin G. Beloev; Ivan V. Vangelov; Dimo T. Garlanov, all of Sofia; Nikolay Y. Nikov, Varna; Ivan S. Savov; Vladimir P. Hlebarov, both of Sofia, all of Bulgaria

[73] Assignee: Npk za Kontrolno Zavarachni Raboti, Sofia, Bulgaria

[21] Appl. No.: 202,728

[22] Filed: Oct. 31, 1980

[51] Int. Cl.³ .................... B05B 15/00; B23K 9/16
[52] U.S. Cl. .................... 239/79; 239/132.3
[58] Field of Search ............ 239/79, 132.3, 599, 239/DIG. 7, 424, 400, 401, 402, 403, 404

[56] References Cited

U.S. PATENT DOCUMENTS

| 3,459,376 | 8/1969 | Haase et al. | 239/79 |
| 3,880,354 | 4/1975 | Van Horn | 239/132.3 |
| 4,216,908 | 8/1980 | Sakurai et al. | 239/132.3 |

Primary Examiner—James B. Marbert

[57] ABSTRACT

Plasma torch or plasmotron for processing metals in the air or under water. The plasma stream issuing from the torch is shielded by a conical spray of water issuing from the torch. The water spray is given a rotary or whirling motion, thereby increasing its effectiveness in shielding the plasma stream, and insuring outer water shielding of the plasma stream with its changing shape and movement in accordance with changes in the medium wherein the processing is carried out.

3 Claims, 2 Drawing Figures

PLASMA TORCH FOR PROCESSING METALS IN THE AIR AND UNDER WATER

This invention relates to a plasma torch or plasmotron for processing metals in the air and under water; the plasmotron can be used in shipbuilding, marine construction, as well as in other engineering operations.

A plasmotron is known for processing metals in air or under water. Such plasmotron has a hermetically sealed metallic body in which there is disposed a cathode holder which has a replaceable cathode tip or head on its front end. At the back of the body of the plasmotron there are provisions for receiving water and the power supply cable. Inside the cathode holder there is a pipe which is spaced therefrom so as to form an annular space therebetween. Along the outer surface of the cathode holder, there is disposed a cylindrical insulator with a cross connecting opening. In the metallic body of the plasmotron there are provided two sector canals opposite each other. The cross connecting opening in the cylindrical insulator is connected at one end to the concentric space within the cathode holder and at the other end to one of the two sector channels. At the front inside end of the hermetically sealed metallic body there is disposed a replaceable conical nozzle to the rear of which there are located the openings of the sector channels. Small diameter channels are drilled laterally in the nozzle, such channels being tangentially connected to the main cylindrical channel of the nozzle. The plasmotron is closed with a front closing hood, which is screwed on the outer surface of the metallic body. Between the nozzle and the internal surface of the front end conical closing hood there is formed a conical space. Such conical space is closed when the plasmotron is employed with a closed cooling system, and is open in front when the plasmotron is employed with an open cooling system. A threaded opening is provided laterally in the metallic hermetically sealed body of the plasmotron, such opening receiving a device for the manual start-up of the plasmotron.

A disadvantage of the above referred to prior plasmotron is that when cutting in air and particularly when cutting an opening in sheet metal with a maximum thickness for cutting by a plasmotron, a strong reversed thermal flow is produced. Such thermal flow strongly impacts on the nozzle of the plasmotron, the front end of the closing hood, as well as the metallic body thereof, so as to erode and wear them quite rapidly. Aside from that, this thermal flow effect creates several conditions, including the creation of unwanted dual arcs, which lead to internal and outer ruptures in the parts of the plasmotron.

Another disadvantage of such prior plasmotron is that, when plasma cutting under water, the hydrostatic pressure increases with increase in the depth at which the operation is carried out. In order to maintain the quality of the processed material, it is necessary continuously to change the gas dynamic and energy parameters employed during working.

The present invention has among its objects the provision of a plasmotron for processing metals in air or under water which insures outer water shielding of the plasma with changing shape and movement, in accordance with the medium wherein the processing is carried out and the pressure of the water supply, whereby to provide a process of high productivity, safety, and reliability.

These objects are achieved by the plasmotron in accordance with the invention. Such plasmotron has an outer hermetically sealed body in which there are mounted a device for the manual starting of the plasma, and a cathode holder with a replaceable cathode tip or head. The outer body of the plasmotron is covered with a hermetic fixed insulating sheath. On the front end of the metal body of the plasmotron there is mounted a conical nozzle. The conical nozzle is covered by a closing hood which is screwed onto the metallic body of the plasmotron in such a way as to form a conical space between the conical nozzle and the closing hood. The front end of such conical space is formed as a central circular opening for the plasma discharge. Sector channels are machined into the inner metal body of the plasmotron. In addition, along the wide end of the outer conical surface of the nozzle there is machined a cylindrical surface in which the cylindrical water whirling cooling device is disposed. The outer diameter of the cylindrical whirling device coincides with the radially inner lines of the sector channels. On the front side surface of the cylindrical whirling device there are channels which are situated tangentially to its inner diameter. The upper end of the tangential channels are conducted to the cylindrical space which is formed by the internal vertical and horizontal surfaces of the closing hood, the front metallic surface of the hermetically sealed plasmotron body and the upper outer surface of the whirling device. The other ends of the tangential channels are connected to the conical space created by the conical surface of the closing hood and the outer surface of the conical nozzle. The tangential channels are closed sidewardly by the inside vertical surface of the closing hood, the internal conical surface of which has the same angle as that of the outer conical surface of the nozzle. The front, concentric, opening between the nozzle and the closing hood has an outer diameter equal to the diameter of the upper small end of the conical nozzle.

The advantages of the plasmotron of the invention are that it can be used not only for cutting but also for drilling, since this design avoids the creation of reversed thermal flow from the work back to the plasmotron. This allows the outer sheath of the plasmotron to be made of plastic material, thereby markedly reducing its weight.

Figure 2:
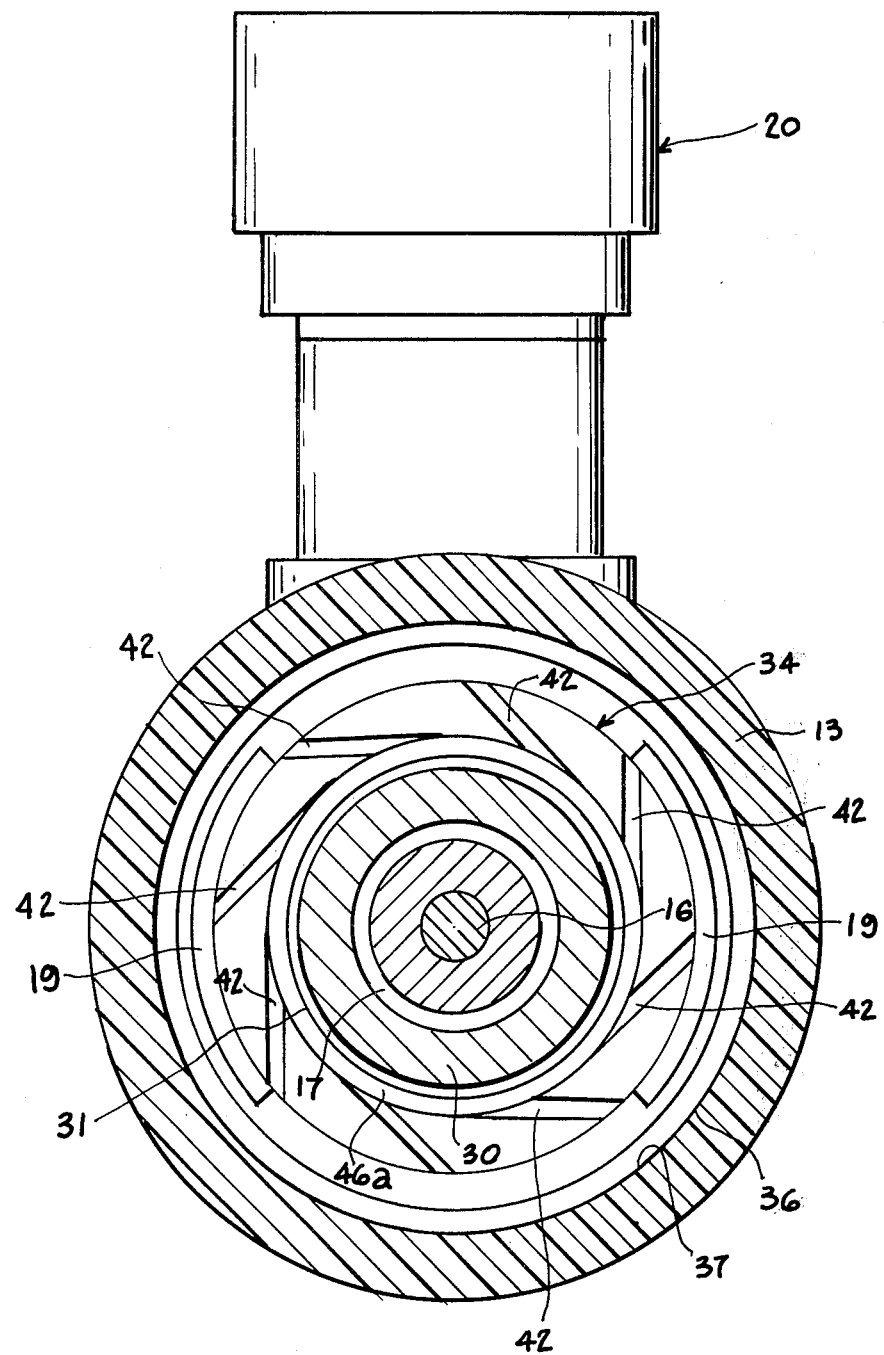

The invention will be readily understood upon consideration of the accompanying drawings, in which:

FIG. 1 is a fragmentary view in vertical axial section through a preferred embodiment of the plasmotron of the invention, and FIG. 2 is a view in transverse section through the plasmotron of FIG. 1, the section being taken along the line 2.2 in FIG. 1.

The illustrative plasmotron is designated generally by the reference character 10. Plasmotron 10 has an inner metallic body generally designated 11, and an outer, electrically insulating plastic sheath generally designated 12. The sheath 12 has a forward end or hood portion which is removably mounted upon the body 11 as by being screwed thereto and is sealed to it by an O-ring 13a.

The inner metallic body 11 of the plasmotron is generally made up of two concentric spaced parts, the outer part 14 constituting the anode of the plasmotron and the inner part 15 of body 11 constituting the cathode thereof. The cathode has a replaceable cathode 16. Parts 14 and 15 are spaced from each other so as to present an annular gas conducting channel 17 there between. It is to be understood that the rear end of the plasmotron (not shown) provides means for the supply of water to the annular channel 19, gas to the annular channel 17, and electric power to the anode and cathode of the plasmotron by cable means.

An arc between the anode and cathode of the plasmotron is initiated by the manual start-up means generally shown at 20 after flow of gas to channel 17 and water to channels 19 has been initiated. The flow of gas causes the arc to be projected forwardly from the nozzle of the plasmotron as a plasma 21, the water issuing from the nozzle as a sheath 22 surrounding the plasma as the plasma impinges on a metal work piece 24 through which a hole is to be cut.

The cathode 15, which is mounted upon an electrically insulating support, is fed with power through a cable 23 as shown.

To the front inside metallic end of the hermetic body 11 a conical nozzle 30 is fit, which is covered by the closing hood 13. The closing hood is screwed on the upper metalic part of the body 11 in such a way as to form a conical annular space 46 between the conical nozzle 30 and the closing hood 13. This conical space 46 between the conical nozzle 30 and the closing hood 13 has a front concentric opening 51. In the body 11 there are machined sector channels 19. Along the wide end of the outer conical surface 31 of the conical nozzle 30 a cylindrical surface is machined, on which there is fitted a cylindrical water whirling device 34. The outer diameter 35 of the whirling device 34 coincides with the inside line of the sector channels 19. On the front side surface of the shirling device 34 there are machined channels tangentially to its inside diameter. The tangential channels 12 are connected at their radially outer ends to the cylindrical annular space 36, formed by the inside horizontal surface 37 and vertical surface 39 (FIG. 1) of the closing hood 13, the front metallic surface 40 of the body 11 and the radially inner outer surface 35 of the cylindrical whirling device 34. The annular ends of the tangential channels 42 are connected to an annular space 46a connected to the rear, larger diameter end of the conical annular space 46. The tangential channels 42 are closed at their forward sides by the internal vertical surface 39 of the closing hood 13, while its inside conical surface 47 forms an angle α with the longitudinal axis of the plasmotron channel 31 identical with that of the internal conical surface 31 of the conical nozzle 30. The front concentric opening 51, between the conical nozzle 30 and the closing hood 13 which had an inside diameter equal to the diameter of the small base 50 of the conical nozzle 30.

The functioning of the plasmotron is as follows:

After leaving the sector channels 19 the water enters the cylindrical annular space 36. After that, water flowing through the tangential channels 42 of the cylindrical whirling device 34 is directed tangentially towards the conical space 46 and the outer conical surface 31 of the conical nozzle 30. This tangentially directing force causes the water in the conical space 46 to both rotate and to move forwardly in the forward direction identical with that of the plasma gas; the direction of rotation of such water depends on the direction of inclination of the tangential channels 42 of the cylindrical whirling device 34. The moving water increases its speed of rotation and its forward motion, when approaching the front concentrical opening 51, since the cross-section of the conical space 46 is continuously reduced in a forward direction.

When the water stream emerges from the front concentric opening 50, it has the shape of a hollow truncated cone, which has an upper base having the diameter of the concentric opening 50, while the whole cone of water rotates around its axis. By changing the pressure of the water fed along the sector channels 19, it is possible to change the shape of the cone. By increasing the pressure the cone increases the diameter of its smaller base by slightly lifting itself vertically upwards, while creating a barrier about the plasma in front of the whole body of the plasmotron. When working under water, the shape of the water stream is changed according to the depth and the pressure of the water fed along the sector channels 19.

As a result of interaction between the surrounding water and the flowing out water stream directed to the treated metal work piece a hydrodynamic effect of a "whirling stream" is created. This effect causes creation of a low-pressure space in front of nozzle 30. The value of this pressure lowering depends on the distance between the closing hood 13 and the metal work piece, on the pressure of water flowing along channels 19, on the depth of submersion, the angle between the axis of nozzle 30 and the metal work piece, on the geometric parameters of nozzle 30, on the size of the angle α, the angle of inclination of the channels 42 towards the nozzle 30 axis. This low pressure in front of the nozzle 30 opening lowers the side and front hydrostatic pressure and causes the increase of gasodynamic pressure of the plasma stream, which influences the quality of the cuttings.

Although the invention is illustrated and described with reference to one preferred embodiment thereof, it is to be expressly understood that it is no way limited to the disclosure of such a preferred embodiment, but is capable of numerous modifications within the scope of the appended claims.

We claim:

1. A plasma torch having a body with a front end and a rear end, a nozzle on the front end of the body, the nozzle having a plasma stream discharge opening therein, an anode and a cathode disposed in spaced relationship within the body rearwardly of the nozzle, a gas conducting channel extending between the anode and the cathode and forwardly out of the plasma stream discharge opening in the nozzle, the nozzle having an annular water-discharging opening therein surrounding the plasma discharge opening, so as to surround the plasma stream discharge from the nozzle with a plasma shielding compact water stream, a water-conducting channel in the body leading to the water discharging opening therein, and means interposed in the water-discharging passage to impart a whirling motion to the water stream surrounding the plasma stream discharged from the nozzle.

2. The plasm torch according to claim 1, wherein the water-conducting channel is formed by means which include means forming an annular space disposed generally in a plane transverse to the direction of discharge of the plasma stream, the means which imparts a whirling motion to the water spray discharged from the nozzle is disposed in said annular space, and comprising means in the nozzle forming an annular frusto-conical water-conducting passage extending between the means which imparts a whirling motion to the water spray and the water-discharging opening in the nozzle.

3. The plasma torch according to claim 1, wherein the means which imparts a whirling motion to the water stream is an annular body disposed in said annular space past which the water in the water-conducting channel flows on its way to the nozzle, said annular body having a plurality of similar parallel passages therein which extend generally tangential to the radially inner and radially outer circumferences of the annular space.

* * * * *